(12) United States Patent
Hung et al.

(10) Patent No.: US 7,292,294 B2
(45) Date of Patent: Nov. 6, 2007

(54) MANUFACTURING METHOD OF COLOR FILTER ON TFT ARRAY AND MANUFACTURING METHOD OF LCD PANEL

(75) Inventors: Mu-Ching Hung, Hsinchu (TW); Chi-Jan Yang, Taipei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 357 days.

(21) Appl. No.: 10/904,295

(22) Filed: Nov. 3, 2004

(65) Prior Publication Data

US 2006/0093928 A1 May 4, 2006

(51) Int. Cl.
*G02F 1/1335* (2006.01)
*G02F 1/1343* (2006.01)
*G02F 1/136* (2006.01)

(52) U.S. Cl. .................. 349/106; 349/141; 349/44

(58) Field of Classification Search ............... 349/106, 349/141, 44
See application file for complete search history.

(56) References Cited

U.S. PATENT DOCUMENTS

| | | | | |
|---|---|---|---|---|
| 6,242,139 B1* | 6/2001 | Hedrick et al. | .......... | 430/7 |
| 6,630,274 B1* | 10/2003 | Kiguchi et al. | .......... | 430/7 |
| 6,806,925 B2* | 10/2004 | Ishii et al. | .......... | 349/106 |
| 6,887,631 B2* | 5/2005 | Kiguchi et al. | .......... | 430/7 |
| 6,914,263 B2* | 7/2005 | Yi et al. | .......... | 257/89 |
| 7,111,755 B2* | 9/2006 | Koyama et al. | .......... | 222/1 |
| 2005/0078256 A1* | 4/2005 | Hong | .......... | 349/141 |

* cited by examiner

*Primary Examiner*—Mike Qi
(74) *Attorney, Agent, or Firm*—Jianq Chyun IP Office

(57) ABSTRACT

A method of fabricating a color filter over a TFT array and a method of fabricating a liquid crystal display panel comprising the same are disclosed. First, a substrate having a TFT array thereon is provided. Next, a black matrix is formed over the TFT array for defining a plurality of sub-pixel regions. Next, a plurality of contact holes is formed in the black matrix. Next, an ink-jet process is performed to form a color filter pattern in each sub-pixel region respectively. Thereafter, an overcoat layer is formed over the sub-pixel regions, and then a plurality of openings is formed in the overcoat layer to expose the contact holes in the black matrix. Thereafter, pixel electrodes are formed over the overcoat layer electrically connected to the TFT array through the openings and the contact holes.

19 Claims, 7 Drawing Sheets

MANUFACTURING METHOD OF COLOR FILTER ON TFT ARRAY AND MANUFACTURING METHOD OF LCD PANEL

BACKGROUND OF THE INVENTION

1. Field of the Invention

The present invention generally relates to a method of fabricating a color filter. More particularly, the present invention relates to a method of fabricating a color filter on a thin film transistor (TFT) array.

2. Description of Related Art

As multi-media technology advances, a variety of semiconductor devices or displays have been rapidly developed. Displays, for example, TFT liquid crystal displays, because of its advantages of high resolution, high space-effectiveness, low power consumption and non-radiation, have become the main trend in this industry.

A TFT liquid crystal display comprises a TFT array substrate, a color filter substrate, and a liquid crystal layer. According to one conventional method, the TFT array substrate and the color filter substrate are manufactured separately, and then a TFT liquid crystal display panel with the liquid crystal layer formed there-between. According to another conventional method, first, a color filter is directly formed on a TFT array substrate for reducing the problems in reduction of aperture ratio and misalignment between the TFT array substrate and the color filter substrate.

FIG. 1A to 1F illustrate a process of fabricating a color filter on a TFT array substrate. First, a substrate 100 having a TFT array 110 thereon is provided, wherein the TFT array 110 comprises a plurality of gates 112, a gate-insulating layer 114, a plurality of semi-conductive layer 116 and a plurality of sources/drains 118a/118b.

Next, referring to FIG. 1B, a passivation layer 190 is formed over the TFT array 110, and a plurality of openings 170a is formed in the passivation layer 190 to expose the drains 118b.

Next, referring to FIG. 1C, red filter patterns 150a are formed on the passivation 190. According to an embodiment of the present invention, a red photoresist layer is formed over the passivation layer 190 by spin coating, and subsequently, the red photoresist layer is then exposed and then etched in a conventional photolithography process, and finally baked to form a red filter pattern 150a and openings 170b exposing the openings 170a and thereby exposing the drains 118b.

Next, referring to FIG. 1D, similarly, the above process may be repeated to form green filtering pattern 150b and blue filter pattern 150c. Furthermore, a black matrix 120 may be formed between the color filters patterns 150a, 150b, and 150c.

Next, as shown in FIG. 1E, an overcoat layer 160 is formed over the black matrix 120 and the color filtering patterns 150a, 150b, and 150c. And a plurality of contact holes 140 is formed in the overcoat layer 160 to expose the drains 118b.

Next, as shown in FIG. 1F, a plurality of pixel electrodes 180 is formed over the overcoat layer 160 and electrically connected to the drains 118b of the TFT array 110 through the contact holes 140 respectively.

As described in the above conventional method, red, green, and blue filter patterns are formed separately by coating, photolithography process including exposure and etching, and baking. Therefore, the conventional process not only requires many additional process steps but is also a complicated process in which the risk of reduction in the yields is high. Furthermore, the masking step used for defining the color filter patterns would substantially increase the manufacturing cost. In addition, the difficulty in coating the color photoresist could more obvious and amplified as the size of the TFT substrate is enlarged.

SUMMARY OF THE INVENTION

Accordingly, the present invention is directed to a method of fabricating a color filter over a TFT array, in which ink-jet technology is applied to form the color filter patterns and thereby simplifying the fabrication process the color filter.

The present invention is also directed to a method of fabricating a liquid crystal display panel, in which ink-jet technology is applied to form the color filter patterns on the TFT array of the liquid crystal display panel. The fabrication process of the liquid crystal display can be substantially simplified.

According to an embodiment of the present invention, first, a substrate having a TFT array thereon is provided. Next, a black matrix is formed over the TFT array for defining a plurality of sub-pixel regions, and a plurality of contact holes is formed in the black matrix. Next, an ink-jet process is performed to form a color filter pattern in each sub-pixel region. Next, an overcoat layer is formed over the sub-pixel regions, and a plurality of openings is formed in the overcoat layer to expose the contact holes in the black matrix. Thereafter, a plurality of pixel electrodes is formed over the overcoat layer, wherein the pixel electrodes are electrically connected to the TFT array through the openings and the contact holes.

A method of fabricating a liquid crystal display panel according to an embodiment of the present invention is described as follows. First, a first substrate having a TFT array thereon is provided. Next, a black matrix is formed over the TFT array for defining a plurality of sub-pixel regions, and a plurality of contact holes are formed in the black matrix. Next, an ink-jet process is performed to form a color filter pattern in each sub-pixel region. Next, an overcoat layer is formed over the sub-pixel regions, and a plurality of openings is formed in the overcoat layer to expose the contact holes in the black matrix. Thereafter, a plurality of pixel electrodes is formed over the overcoat layer, wherein the pixel electrodes are electrically connected to the TFT array through the openings and the contact holes. Next, a liquid crystal layer is formed over the pixel electrodes and a second substrate is disposed over the liquid crystal layer so that the liquid crystal layer is formed between the first substrate and the second substrate.

According to an embodiment of the present invention, the second substrate, for example, comprises a glass substrate and a common electrode film is formed over the glass substrate.

According to an embodiment of the present invention, the second substrate, for example, comprises a glass substrate, and a plurality of common electrodes may be formed over the overcoat layer after the process of forming the pixel electrodes over the overcoat layer.

According to an embodiment of the present invention, a passivation layer may be formed over the TFT array before forming the black matrix.

According to an embodiment of the present invention, the black matrix may be formed, for example, by forming a material layer over the substrate and then patterning the material layer. The method of forming the material layer may be spin coating, slit/spin coating, or spin-less coating. In addition, the material layer may be black resin.

According to an embodiment of the present invention, the ink-jet process described above may include, for example, printing a color filter pattern in each sub-pixel region and baking the color filter pattern.

According to an embodiment of the present invention, the material of the overcoat layer may be an organic photosensitive resin selected from the group consisting of Benzocyclobutene, Acrylic, Polyimide, Styrene, and combinations thereof.

In the present embodiment of the present invention, color filter patterns of different colors can be simultaneously formed by the ink-jet process including ink-jetting and baking. Accordingly, the method of the present invention is substantially simpler and superior compared to the conventional method of forming the red, green, and blue filter patterns described above. In addition, the coating problems associated with the increase in the size of the TFT substrate during coating of the color photoresist can be effectively eliminated. Furthermore, because the masking process is not required for forming the filter patterns, therefore the overall fabrication cost can be effectively reduced. Accordingly, the fabrication process of the present invention being simpler due elimination of masking process used in the conventional method, therefore the problems due to coating and misalignment can be effectively eliminated and thus not only the manufacturing cost is reduced but also process yield can be effectively promoted.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
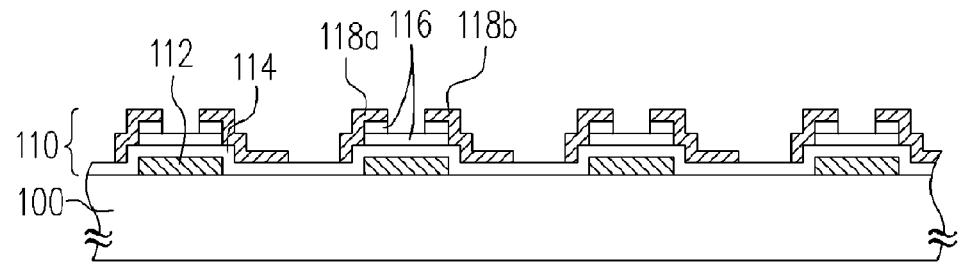
FIG. 1A to 1F are schematic views illustrating a conventional method of fabricating a color filter over a TFT array.
Figure 1B:
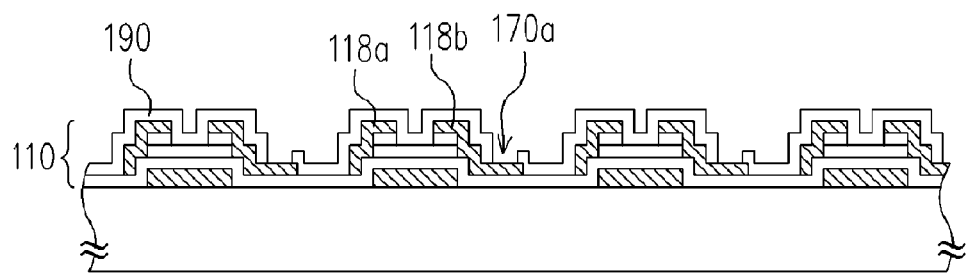
Figure 1C:
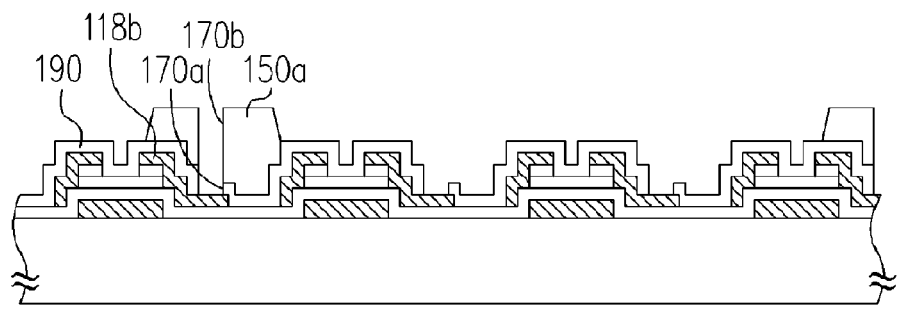
Figure 1D:
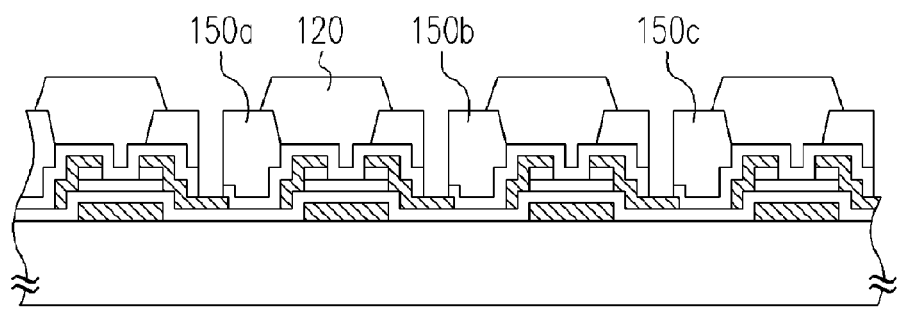
Figure 1E:
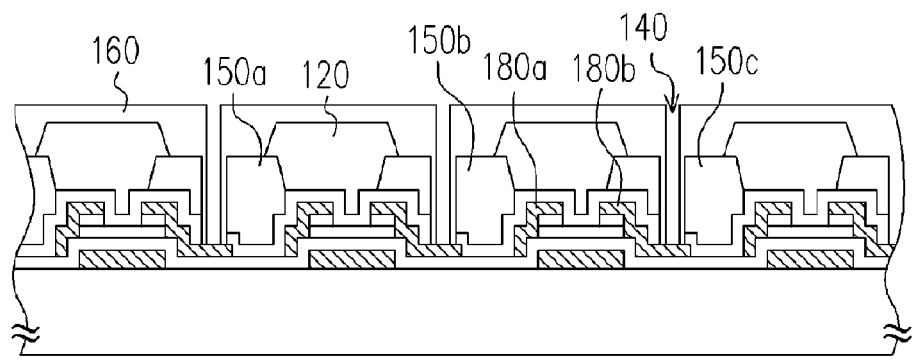
Figure 1F:
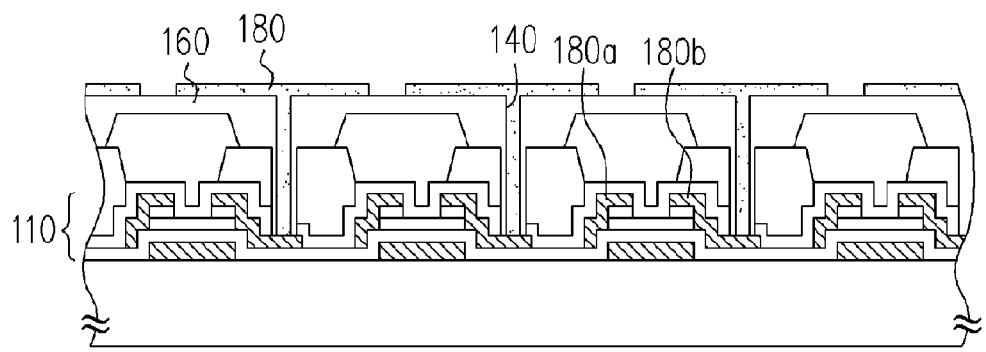

Reference will now be made in detail to the present preferred embodiments of the invention, examples of which are illustrated in the accompanying drawings. Wherever possible, the same reference numbers are used in the drawings and the description to refer to the same or like parts.

Figure 2A:
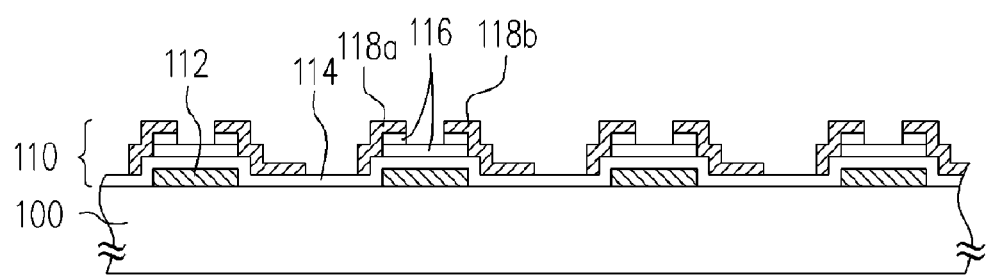
FIG. 2A to 2E are schematic views illustrating a method fabricating of a color filter over a TFT array according to an embodiment of the present invention.

Hereinafter, the method of fabricating the color filter over the TFT array substrate, according to an embodiment of the present invention, will be described with reference to FIG. 2A to 2E and FIG. 3A to 3B. First, referring to FIG. 2A, a substrate 100 having a TFT array 110 thereon is provided. As shown in FIG. 2A, the TFT array 110 comprises a plurality of gates 112, a gate-insulating layer 114 covering the gates 112 is covered with the gate-insulating layer 114, semiconductive layers 116 comprising, for example, channels and ohmic contact layers thereon, formed over the gate-insulating layer 114; and source/drain regions 118a/118b over the semi-conductive layers 116.

Figure 2B:
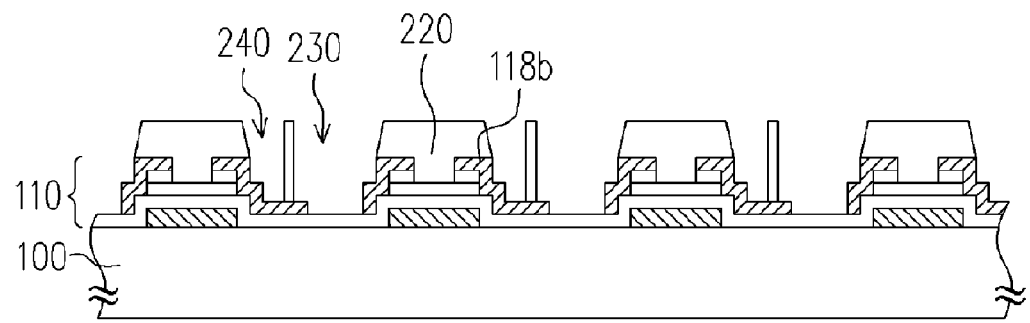
Figure 3A:
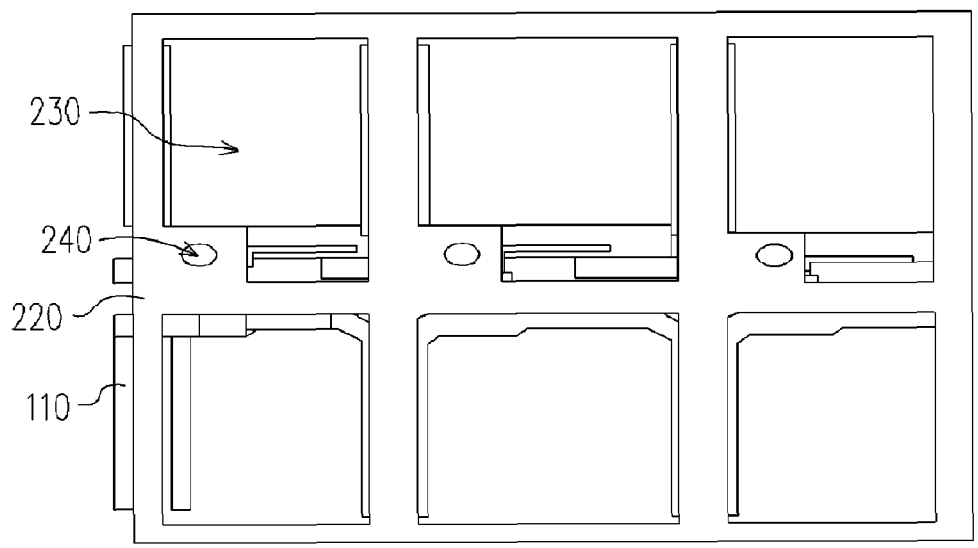
FIGS. 3A and 3B are top views of a TFT array according to an embodiment of the present invention.

Next, as shown in FIGS. 2B and 3A, a patterned black matrix 220 is formed over the TFT array 110 for defining a plurality of sub-pixel regions and a plurality of contact holes 240 are formed in the black matrix 220 to expose a portion of the drains 118b of the TFT array 110. According to an embodiment, the patterned black matrix 220, for example, can be formed by first forming a material layer on the substrate 100 first, and then patterning the material layer. The material layer may be formed over the substrate 100 by performing spin coating, slit/spin coating, or spin-less coating. The material layer may be patterned by utilizing the conventional photolithography process including exposure and etching, and baking. According to an embodiment of the present invention, the material layer comprises, for example, black resin.

Figure 2C:
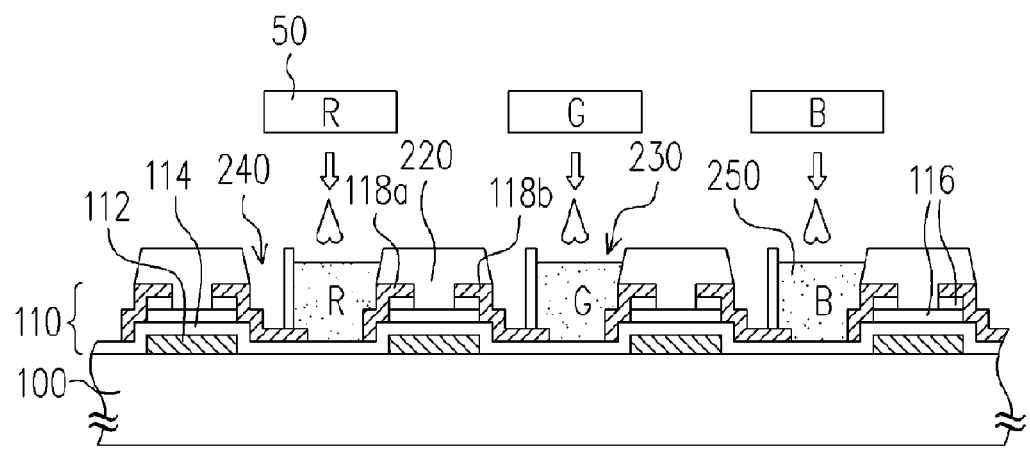
Figure 2D:
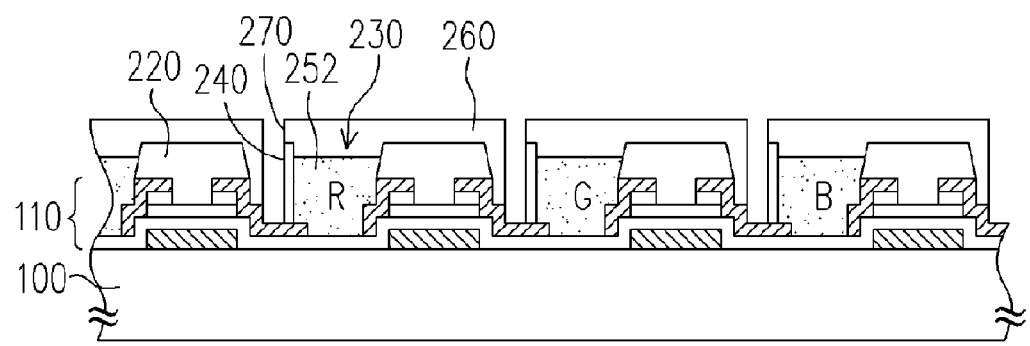
Figure 3B:
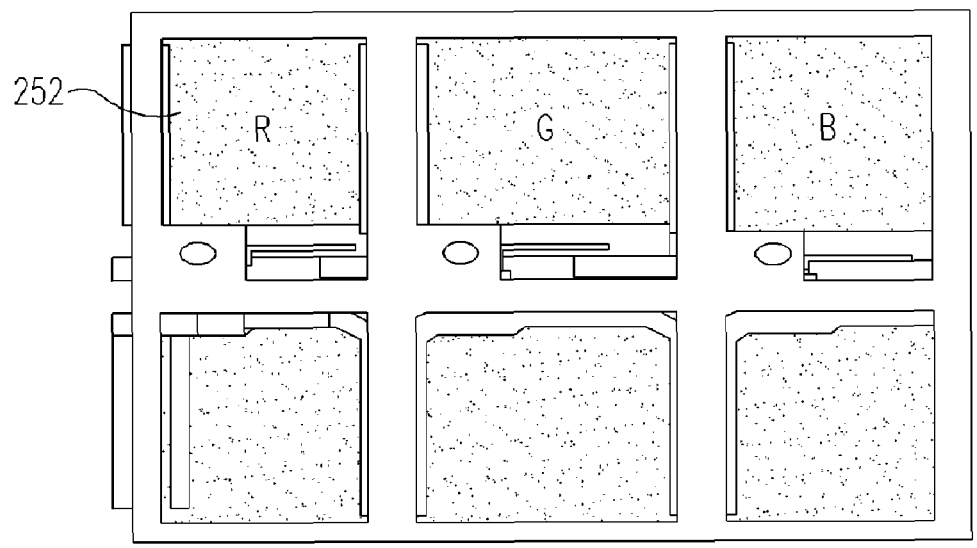

Next, referring to FIGS. 2C, 2D, and 3B, an ink-jet process is performed to form a color filter pattern 252 comprising red, blue and green color in each sub-pixel region 230 respectively. It should be noted that the color filter pattern 252 comprising red, blue and green colors is formed in substantially one process step by injecting respective color ink 250 into the sub-pixel regions 230 via nozzles 50 respectively. Subsequently, color filter pattern 252 is baked as shown in FIG. 2D. According to the present embodiment, because the color filter pattern 252 comprising red, green and blue colors is formed substantially by a single process including injection and baking steps for forming red, blue and green filters, therefore the fabrication process of forming the color filter pattern is substantially more simpler compared to the conventional process described above.

Thereafter, as shown in FIG. 2D, an overcoat layer 260 is formed over the sub-pixel regions 230, and then a plurality of openings 270 is formed in the overcoat layer 260 to expose the contact holes 240 in the black matrix 220. According to an embodiment of the present invention, a spin coating method may be utilized to form the overcoat layer 260, wherein a overcoat material may be spin coated over the color filter pattern 252 and the black matrix 220 and then the overcoat material layer is baked to form the overcoat layer 260. According to an embodiment of the present invention, a conventional photolithography process including exposure and etching steps may be utilized for patterning the overcoat layer 260 to form the openings 270. The overcoat layer 260 comprises, for example but not limited to, an organic photosensitive resin selected from the group consisting of Benzocyclobutene, Acrylic, Polyimide, Styrene, and combinations thereof.

Figure 2E:
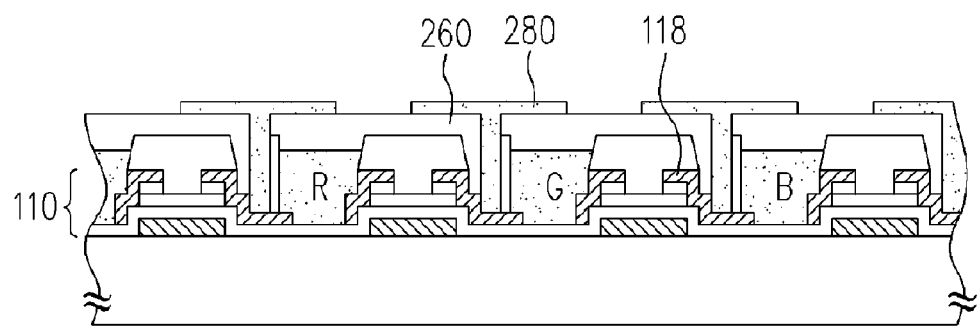

Next, as shown in FIG. 2E, a plurality of pixel electrodes 280 are formed over the overcoat layer 260 for electrically connecting to the drains 118b of the TFT array 110 through the openings 270 (as shown in FIG. 2D) and contact holes 240 (as shown in FIG. 2D). The pixel electrodes 280 comprise, for example but not limited to, transparent conductive films made of Indium Tin Oxide (ITO). According to an embodiment of the present invention, the pixel electrodes may be formed over the overcoat layer 260 via, for example, conventional sputtering and photolithography processes. In the present embodiment, due to the advantages of lower dielectric constant, higher heat-resistance, and thinness/flatness of the overcoat layer 260 (organic photosensitive resin), the pixel electrodes 280 can be easily formed above scan lines or data lines and provide a higher aperture ratio.

Figure 4:
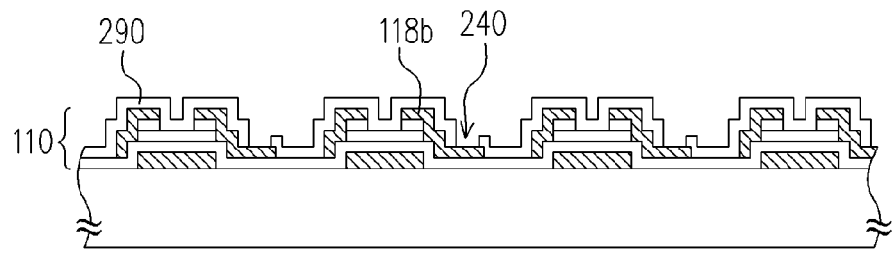
FIG. 4 is a schematic cross sectional view of a color filter over a TFT array according to another embodiment of the present invention.

FIG. 4 illustrates a schematic drawing of a color filter over a TFT array according to another embodiment of the present invention. Referring to FIG. 4, before forming the black matrix 220, a passivation layer 290 may be formed over the TFT array 110, and then a plurality of contact holes 240 may be formed in the passivation layer 290 to expose the drains 118b of the TFT array 110. The material of the passivation layer 290, for example, is silicon nitride (SiNx). Hereinafter, the fabrication process of the passivation layer 290 is described. First, a silicon nitride layer is formed over the TFT array 110, and then a patterned photoresist layer is formed over the silicon nitride layer. Next, the silicon nitride layer is etched to form the contact holes 240 in the passivation layer 290 using the patterned photoresist layer as an etching mask. Next, the patterned photoresist layer is removed.

Figure 5A:
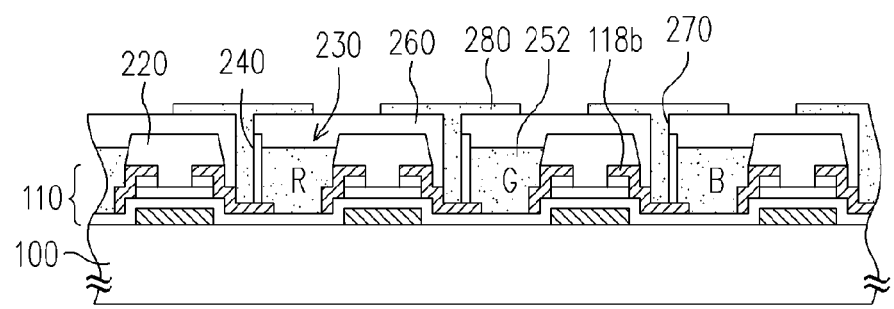
FIG. 5A to 5B are schematic views illustrating a method of fabricating a liquid crystal display panel according to an embodiment of the present invention.

Hereinafter, the method of fabricating a liquid crystal display panel according to an embodiment of the present invention will described with reference to FIGS. 5A and 5B. Referring to FIG. 5A, a black matrix 220 is formed over a substrate 100 having a TFT array 110 thereon for defining a plurality of sub-pixel regions 230, and then a plurality of contact holes 240 in the black matrix 220 by performing a process similar to the process described above with reference to FIG. 2A to 2E, and therefore detail description thereof is not repeated. Next, an ink-jet process is performed for forming a color filter pattern 252 in each sub-pixel region 230 respectively. Next, an overcoat layer 260 is formed over the sub-pixel regions 230, and then a plurality of openings 270 are formed in the overcoat layer 260 to expose the contact holes 240 in the black matrix 220. Next, a plurality of pixel electrodes 280 is formed over the overcoat layer 260, wherein the pixel electrodes 280 are electrically connected to the drains 118b of the TFT array 110 through the openings 270 and the contact holes 240.

Furthermore, according to another embodiment of the present invention, the passivation 290 (as shown in FIG. 4) is formed over the TFT array 110 before forming the black matrix 220.

Figure 5B:
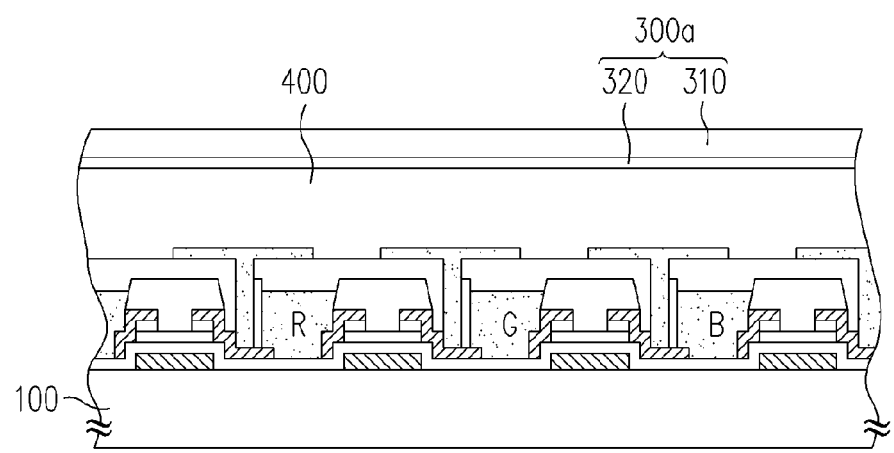

Referring to FIG. 5B, a liquid crystal layer 400 is formed over the pixel electrodes 280 and then a substrate 300a is disposed over the liquid crystal layer 400 so that the liquid crystal layer 400 is formed between the substrate 100 and substrate 300a. According to an embodiment of the present invention, the substrate 300a, for example, comprises a glass substrate 310 and a common electrode film 320 thereon. The common electrode 320 may be a transparent conductive film, for example, made of Indium Tin Oxide (ITO). In addition, the liquid crystal layer 400 may be formed by, for example, One Drop Fill (ODF) technology. In the process of ODF technology, first, a sealant may be formed over the substrate 100 for surrounding a space, wherein the sealant can be a UV (ultraviolet) cured sealant. Next, the liquid crystal is dropped into the space surrounded by the sealant. Next, the substrate 100 and the substrate 300a are aligned and assembled together under vacuum, and then the sealant is cured by UV light.

Figure 6:
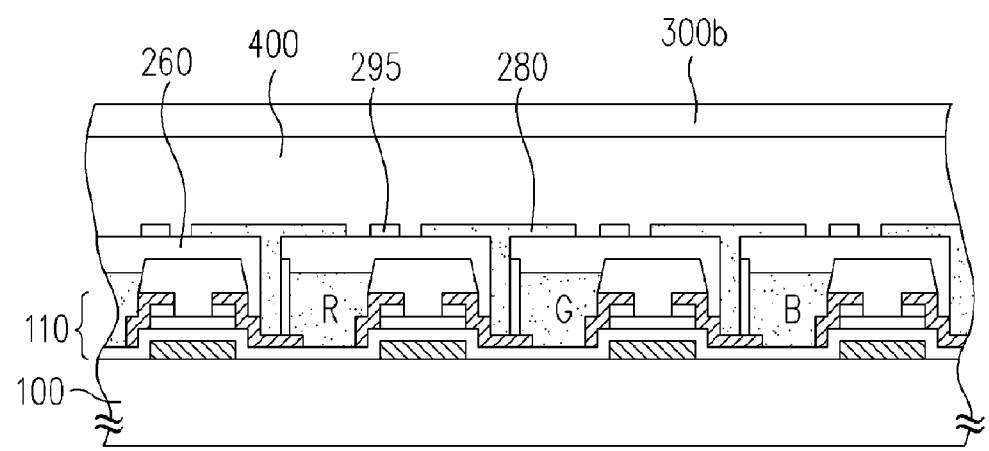
FIG. 6 is a schematic view of a liquid crystal display panel according to an embodiment of the present invention.

FIG. 6 illustrates a schematic drawing of a liquid crystal display panel according to another embodiment of the present invention. Referring to FIG. 6, an In-Plane Switching (IPS) mode liquid crystal display panel is provided, wherein the substrate 300b, for example, is a glass substrate. Furthermore, besides forming the pixel electrodes 280, a plurality of common electrodes 295 are also formed on the overcoat layer 260. It should be noted that the pixel electrodes 280 and the common electrodes 295 may be fabricated by using the process similar to those described above, and therefore detailed description thereof is not repeated.

In summary, according to the present embodiment of the present invention, an ink-jet process may be utilized to form the color filter pattern comprising red, blue and green colors for forming the red, blue and green color filters over the TFT array. Therefore, it is possible to form the red, blue and green filter patterns in a single ink-jet process including simple injection and baking process steps. Accordingly, the fabrication process of the present invention is superior compared to the conventional process where the red, green, and blue filter patterns are separately formed via complex processing steps including coating, exposure, etching and baking steps. Furthermore, because the problems associated with the coating photoresist and misalignment of mask can be effectively eliminated, therefore the process yield can be effectively promoted. In addition, the problem associated with coating color photoresist over the large size TFT substrate for forming color filters can be also be effectively eliminated. Furthermore, because the fabrication process greatly reduces the process steps of fabricating the color filters and also greatly simplifies the process compared to the conventional process, therefore the overall fabrication cost can be effectively reduced.

In summary, compared to the conventional process, the fabrication process of the present invention is capable of effectively reducing the process steps for fabricating the color filter over the TFT array by utilizing the ink-jet process where the red, blue and green color filter patterns are formed by a single process including simple injection and baking process steps, therefore the process time and fabrication cost can be effectively reduced. Furthermore, the misalignment between the TFT array substrate and the color filter substrate can also be effectively avoided. In addition, one masking process can be eliminated by replacing the passivation with the color filter patterns, the black matrix, and the overcoat layer, therefore the cost incurring from the masking process and the material used in the passivation can be effectively eliminated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a color filter over a TFT array, comprising:

providing a substrate comprising a TFT array formed thereon;

forming a black matrix over the TFT array for defining a plurality of sub-pixel regions;

forming a plurality of contact holes in the black matrix;

performing an ink-jet process to form a color filter pattern in each sub-pixel region respectively;

forming an overcoat layer over the sub-pixel regions;

forming a plurality of openings in the overcoat layer to expose the contact holes in the black matrix; and forming a plurality of pixel electrodes over the overcoat layer, wherein the pixel electrodes are electrically connected to the TFT array through the openings and the contact holes.

2. The method of fabricating a color fiber over a TFT array according to claim 1, further comprising a step of forming a passivation layer over the TFT array before the step of forming the black matrix.

3. The method of fabricating a color filter over a TFT array according to claim 1, wherein the step of forming the black matrix comprises:
forming a material layer over the substrate; and
patterning the material layer.

4. The method of fabricating a color filter over a TFT array according to claim 3, wherein the material layer is formed by performing spin coating, slit/spin coating, or spin-less coating.

5. The method of fabricating a color filter over a TFT array according to claim 3, wherein the material layer is a black resin.

6. The method of fabricating a color filter over a TFT array according to claim 1, wherein the ink-jet process comprises:
injecting color ink in each sub-pixel region respectively to form the color filter pattern; and
baking the color filter pattern.

7. The method of fabricating a color filter over a TFT array according to claim 1, wherein the overcoat layer comprises an organic photosensitive resin.

8. The method of fabricating a color filter over a TFT array according to claim 7, wherein the organic photosensitive resin comprises a material selected from the group consisting of Benzocyclobutene, Acrylic, Polyimide, Styrene, and combinations thereof.

9. A method of a liquid crystal display panel, comprising:
providing a first substrate comprising a TFT array formed thereon;
forming a black matrix over the TFT array for defining a plurality of sub-pixel regions;
forming a plurality of contact holes in the black matrix;
performing an ink-jet process to form a color filter pattern in each sub-pixel region respectively;
forming an overcoat layer over the sub-pixel regions;
forming a plurality of openings in the overcoat layer to expose the contact holes in the black matrix;
forming a plurality of pixel electrodes on the overcoat layer, wherein the pixel electrodes are electrically connected to the TFT array through the openings and the contact holes; and
forming a liquid crystal layer over the first substrate; and disposing a second substrate over the liquid crystal layer.

10. The method of fabricating a liquid crystal display panel according to claim 9, further comprising a step of forming a passivation layer over the TFT array before the step of forming the black matrix.

11. The method of fabricating a liquid crystal display panel according to claim 9, wherein the method of forming the black matrix comprises:
forming a material layer over the substrate; and
patterning the material layer.

12. The method of fabricating a liquid crystal display panel according to claim 11, wherein the material layer is formed by performing spin coating, slit/spin coating, or spin-less coating.

13. The method of fabricating a liquid crystal display panel according to claim 11, wherein the material layer is a black resin.

14. The method of fabricating a liquid crystal display panel according to claim 9, wherein the ink-jet process comprises:
injecting color ink in each sub-pixel region respectively to form a color filter pattern therein; and
baking the color filter pattern.

15. The method of fabricating a liquid crystal display panel according to claim 9, wherein the material of the overcoat layer is an organic photosensitive resin.

16. The method of fabricating a liquid crystal display panel according to claim 15, wherein the organic photosensitive resin comprises a material selected from the group consisting of Benzocyclobutene, Acrylic, Polyimide, Styrene, and combinations thereof.

17. The method of fabricating a liquid crystal display panel according to claim 9, wherein the second substrate comprises a glass substrate and a common electrode film formed thereon.

18. The method of fabricating a liquid crystal display panel according to claim 9, further comprising a step of farming a plurality of common electrodes over the overcoat layer after the step of forming the pixel electrodes, and wherein the second substrate is a glass substrate.

19. A method of fabricating a color filter over a TFT array, comprising:
providing a substrate comprising a TFT array formed thereon;
forming a black matrix over the TFT array for defining a plurality of sub-pixel regions, wherein the black matrix comprises a plurality of contact holes located outside the sub-pixel regions;
forming a plurality of color filter patterns in the sub-pixel regions via an ink-jet process;
forming an overcoat layer over the black matrix and the color filter patterns, wherein the overcoat layer has a plurality of openings corresponding to the contact holes; and
forming a plurality of pixel electrodes over the overcoat layer, wherein the pixel electrodes are electrically connected to the TFT array through the openings.

* * * * *